United States Patent
Hong et al.

(10) Patent No.: US 9,314,925 B2
(45) Date of Patent: Apr. 19, 2016

(54) MOBILE ROBOT SYSTEM AND METHOD OF CONTROLLING THE SAME

(71) Applicant: SAMSUNG ELECTRONICS CO., LTD., Suwon-si, Gyeonggi-do (KR)

(72) Inventors: Jun Pyo Hong, Suwon-si (KR); Kyung Hwan Yoo, Incheon-si (KR); Jae Young Jung, Suwon-si (KR); Jae Man Joo, Suwon-si (KR); Dong Won Kim, Hwaseong-si (KR); Woo Ram Chung, Seoul (KR); Hwi Chan Jang, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/176,319

(22) Filed: Feb. 10, 2014

(65) Prior Publication Data
US 2014/0156071 A1    Jun. 5, 2014

Related U.S. Application Data

(62) Division of application No. 12/662,942, filed on May 12, 2010, now Pat. No. 8,688,272.

(30) Foreign Application Priority Data

May 15, 2009  (KR) .......... 10-2009-0042784
Oct. 26, 2009  (KR) .......... 10-2009-101527

(51) Int. Cl.
*G05B 19/04* (2006.01)
*B25J 9/16* (2006.01)
(Continued)

(52) U.S. Cl.
CPC *B25J 9/1676* (2013.01); *B25J 5/00* (2013.01); *B25J 9/0003* (2013.01); *B25J 11/0085* (2013.01); *G05D 1/0234* (2013.01); *G05D 2201/0203* (2013.01)

(58) Field of Classification Search
CPC .......... B25J 9/1616; B25J 5/00; B25J 9/0006; B25J 11/0085; G05D 1/0234
USPC .......................................... 700/253
See application file for complete search history.

(56) References Cited

U.S. PATENT DOCUMENTS 5,652,489 A * 7/1997 Kawakami .......... G05D 1/0242
                                         318/568.12
5,867,800 A * 2/1999 Leif .................... A47L 11/4011
                                         180/167

(Continued)

FOREIGN PATENT DOCUMENTS

EP     1018467 A1 *  7/2000   .......... B62D 57/032
KR     10-0645817      11/2006

(Continued)

OTHER PUBLICATIONS

Omnidirectional Antenna—Date: N/A.*

(Continued)

*Primary Examiner* — Ian Jen
(74) *Attorney, Agent, or Firm* — Staas & Halsey LLP

(57) ABSTRACT

A method of controlling a mobile robot system is provided. The method includes at a mobile robot, transmitting a signal while traveling in a traveling region, at a beacon, receiving the signal transmitted from the mobile robot over 360 degrees and determining whether the mobile robot has approached the beacon, at the beacon, transmitting a response signal to the mobile robot if the mobile robot has approached the beacon, and at the mobile robot, performing avoidance navigation to prevent collision with the beacon when the mobile robot receives the response signal of the beacon.

8 Claims, 10 Drawing Sheets

(51) Int. Cl.
*G05D 1/02* (2006.01)
*B25J 5/00* (2006.01)
*B25J 9/00* (2006.01)
*B25J 11/00* (2006.01)

(56) References Cited

U.S. PATENT DOCUMENTS

| | | | | |
|---|---|---|---|---|
| 6,040,801 | A * | 3/2000 | Dawirs | G01S 5/0009 342/174 |
| 7,054,716 | B2 | 5/2006 | McKee et al. | |
| 7,166,983 | B2 * | 1/2007 | Jung | G05D 1/0225 180/167 |
| 7,286,902 | B2 * | 10/2007 | Kim | G01S 11/16 318/568.12 |
| 7,328,088 | B2 * | 2/2008 | Kim | G01S 5/30 700/245 |
| 7,352,153 | B2 * | 4/2008 | Yan | G05D 1/0225 318/568.11 |
| 7,630,792 | B2 * | 12/2009 | Kim | G01S 1/80 180/167 |
| 7,693,605 | B2 * | 4/2010 | Park | G05D 1/0242 134/18 |
| 2005/0010330 | A1 | 1/2005 | Abramson et al. | |
| 2005/0021178 | A1 * | 1/2005 | Kim et al. | 700/245 |
| 2007/0244610 | A1 * | 10/2007 | Ozick | A47L 5/30 701/23 |
| 2007/0250212 | A1 * | 10/2007 | Halloran | A47L 5/30 700/245 |
| 2007/0271011 | A1 * | 11/2007 | Lee | G05D 1/0242 700/245 |
| 2008/0051953 | A1 * | 2/2008 | Jones | A47L 9/009 701/28 |
| 2008/0065265 | A1 * | 3/2008 | Ozick et al. | 700/245 |
| 2010/0103106 | A1 * | 4/2010 | Chui | 345/166 |
| 2010/0256908 | A1 * | 10/2010 | Shimshoni et al. | 701/300 |
| 2010/0286824 | A1 * | 11/2010 | Solomon | G05D 1/0088 700/248 |
| 2010/0292839 | A1 * | 11/2010 | Hong | G05D 1/0234 700/253 |

FOREIGN PATENT DOCUMENTS

| | | |
|---|---|---|
| KR | 10-0794728 | 1/2008 |
| KR | 10-2008-0072962 | 8/2008 |

OTHER PUBLICATIONS

European Search Report mailed Aug. 16, 2010 in related European Application No. 10161934.4.
Office Action mailed Dec. 29, 2011 in related U.S. Appl. No. 12/662,942.
Final Office Action mailed Jul. 23, 2012 in related U.S. Appl. No. 12/662,942.
Advisory Action mailed Dec. 3, 2012 in related U.S. Appl. No. 12/662,942.
Notice of Allowance mailed Nov. 8, 2013 in related U.S. Appl. No. 12/662,942.
U.S. Appl. No. 12/662,942, filed May 12, 2010, Jun Pyo Hong, Samsung Electronics Co., Ltd.
Korean Office Action mailed Apr. 30, 2014 in related Korean Application No. 10-2009-0101527.
Korean Notice of Allowance mailed Dec. 18, 2014 in related Korean Application No. 10-2009-0101527.
Chinese Notification of Grant mailed Dec. 17, 2014 in related Chinese Application No. 201010502527.6.

* cited by examiner

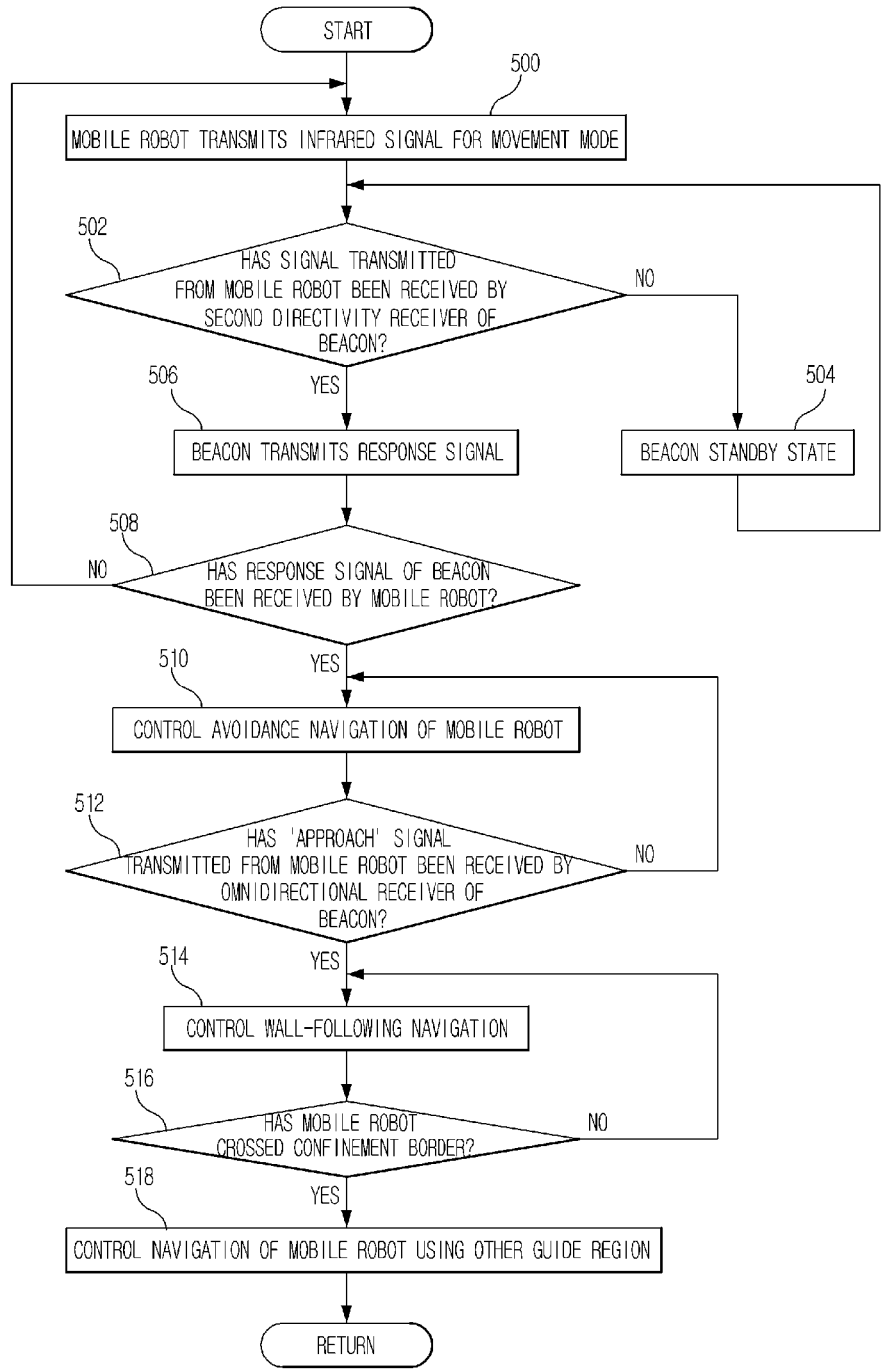

FIG. 10

| SIGNAL TRANSMITTED FROM ROBOT \ BEACON SETTING STATE | HIGH | MEDIUM | LOW |
|---|---|---|---|
| HIGH | AVOIDANCE REPORT | IGNORE | IGNORE |
| MEDIUM | AVOIDANCE REPORT | AVOIDANCE REPORT | IGNORE |
| LOW | AVOIDANCE REPORT | AVOIDANCE REPORT | AVOIDANCE REPORT |
| APPROACH | AVOIDANCE REPORT | AVOIDANCE REPORT | AVOIDANCE REPORT |
| MOVEMENT MODE | LEFT AND RIGHT GUIDING SIGNAL TRANSMISSION (HIGH/MEDIUM/LOW/APPROACH NORMAL OPERATION) | | |

MOBILE ROBOT SYSTEM AND METHOD OF CONTROLLING THE SAME

CROSS-REFERENCE TO RELATED APPLICATIONS

This application is a divisional application of pending U.S. application Ser. No. 12/662,942 filed May 12, 2010, which claims the priority benefit of Korean Patent Application No. 10-2009-0042784, filed on May 15, 2009 in the Korean Intellectual Property Office, and Korean Patent Application No. 10-2009-101527, filed on Oct. 26, 2009 in the Korean Intellectual Property Office, the disclosures of which are incorporated herein by reference.

BACKGROUND

1. Field

Embodiments relate to a mobile robot system to restrict a traveling region of a robot and to guide the robot to another region, and a method of controlling the same.

2. Description of the Related Art

Generally, a mobile robot is a device to perform an operation while autonomously traveling in a traveling region without user control. A robot cleaner which is a mobile robot sucks foreign materials such as dust from a floor while autonomously traveling in a predetermined cleaning region, such as a home or office, so as to perform a cleaning operation.

In order to allow the mobile robot to perform the operation, the mobile robot is prevented from escaping from the traveling region. A virtual wall unit (hereinafter, referred to as a "beacon") to prevent the mobile robot from entering a border (e.g., a doorway or a division between a living room and a kitchen) of the traveling region is provided so as to restrict the traveling region of the mobile robot.

The beacon to restrict the traveling region of the mobile robot continuously transmits an infrared ray (IR) signal to the border of the traveling region so as to generate a beam region. The mobile robot changes a traveling direction thereof so as not to cross the beam region when the IR signal is detected while the mobile robot travels in order to perform the operation, thereby performing avoidance navigation. The mobile robot performs avoidance navigation only when the signal transmitted from the beacon is detected. However, since the beacon continuously transmits the signal even when the mobile robot is not in a signal arrival range of the beacon, high power for transmitting the signal is unnecessarily wasted. Due to the unnecessary power consumption, a battery of the beacon is frequently charged and thus is frequently replaced with a new battery. Thus, a user may be dissatisfied with the life span of the battery.

SUMMARY

Therefore, it is an aspect to provide a mobile robot system to improve energy efficiency of a battery of a beacon by reporting a response signal to restrict a traveling region of a mobile robot to the mobile robot only when a remote controller reception module in the beacon detects a signal transmitted from the mobile robot with low power consumption, and a method of controlling the same.

Additional aspects and/or advantages will be set forth in part in the description which follows and, in part, will be apparent from the description, or may be learned by practice of the invention.

The foregoing and/or other aspects are achieved by providing a mobile robot system including: a mobile robot to transmit a signal while traveling in a traveling region; and a beacon to receive the signal transmitted from the mobile robot and to transmit a response signal to the mobile robot, wherein the beacon restricts a Field-of-View (FOV) to receive the signal and transmits the response signal to the mobile robot only when the signal transmitted from the mobile robot is sensed to be within the restricted FOV.

The signal transmitted from the mobile robot may include an infrared ray, a visible ray, an ultrasonic wave or a laser beam.

The response signal transmitted from the beacon may include an infrared ray, a visible ray, an ultrasonic wave, a Radio Frequency (RF) signal or a laser beam.

The mobile robot may further include one or more transmitters to transmit the signal to report a traveling state of the mobile robot, and the one or more transmitters may transmit the signal in packet units.

The transmitters may be 360-degree spread lenses which are mounted on an upper side of a front surface of a main body of the mobile robot to transmit the signal in all directions in which the mobile robot travels.

The mobile robot may further include one or more receivers to receive the response signal of the beacon, and a robot control unit to control avoidance navigation of the mobile robot if the response signal of the beacon is received.

The avoidance navigation of the mobile robot may enable the mobile robot to rotate until the response signal of the beacon is not received.

The robot control unit may control the mobile robot to start rotation when the response signal of the beacon is received and control the mobile robot to finish rotation and to start cleaning navigation in a direction, in which the rotation is finished, when the response signal of the beacon is not received.

The plurality of receivers may include 180-degree spread lenses which are mounted on a front surface and a side surface of a main body of the mobile robot at a predetermined interval to transmit and receive the signal in all directions in which the mobile robot travels.

The beacon may be mounted so as to be separated from the mobile robot.

The beacon may further include a directivity receiver to receive the signal transmitted from the mobile robot within the restricted FOV, and the directivity may be a slit-shaped remote controller reception module with a width, a length and a height to restrict the FOV.

The directivity receiver may include a first directivity receiver to sense whether the mobile robot has approached a confinement border of the traveling region and second directivity receivers to sense whether the mobile robot has crossed the confinement border and has approached a leading region so as to move to another region.

The first directivity receiver may receive a signal to prevent the mobile robot from crossing the confinement border while the mobile robot performs cleaning while traveling in the traveling region.

The first directivity receiver may be a slit for a confinement border recognition mode, which is mounted on an upper side of a front surface of a main body of the beacon.

The second directivity receiver may receive a signal to indicate that the mobile robot has completed cleaning of the traveling region. The second directivity receivers may be slits for a movement mode, which are mounted on the left and right sides of the first directivity receiver.

The beacon may further include an omnidirectional receiver to receive the signal transmitted from the mobile robot over 360 degrees and to sense whether the mobile robot has approached.

The foregoing and/or other aspects are achieved by providing a method of controlling a mobile robot system, the method including: at a mobile robot, transmitting a signal while traveling in a traveling region; determining whether the signal transmitted from the mobile robot is sensed within a restricted Field-of-View (FOV) of a beacon; at the beacon, transmitting a response signal to the mobile robot if the signal transmitted from the mobile robot is sensed within the restricted FOV; and restricting traveling of the mobile robot such that the mobile robot does not cross a confinement border of the traveling region when the mobile robot receives the response signal of the beacon.

The restriction of the traveling of the mobile robot may include controlling avoidance navigation of the mobile robot such that the mobile robot rotates until the response signal of the beacon is not received.

The mobile robot may start rotation when the response signal of the beacon is received and finishes the rotation and start cleaning navigation in a direction, in which the rotation is finished, when the response signal of the beacon is not received.

The foregoing and/or other aspects are achieved by providing a method of controlling a mobile robot system, the method including: at a mobile robot, transmitting a signal while traveling in a traveling region; at a beacon, receiving the signal transmitted from the mobile robot over 360 degrees and determining whether the mobile robot has approached the beacon; at the beacon, transmitting a response signal to the mobile robot if the mobile robot has approached the beacon; and, at the mobile robot, performing avoidance navigation to prevent collision with the beacon when the mobile robot receives the response signal of the beacon.

The determining of whether the mobile robot has approached the beacon may include determining that the mobile robot has approached the beacon if the beacon senses an "approach" signal transmitted from the mobile robot.

The foregoing and/or other aspects are achieved by providing a method of controlling a mobile robot system, the method including: at a mobile robot, transmitting a signal when cleaning of a traveling region is completed; determining whether the signal transmitted from the mobile robot is sensed within a restricted Field-of-View (FOV) of a beacon; at the beacon, transmitting a response signal to the mobile robot if the signal transmitted from the mobile robot is sensed within the restricted FOV; and guiding the mobile robot to cross a confinement border of the traveling region and to move to another region when the mobile robot receives the response signal of the beacon.

The guiding of the mobile robot may include enabling the mobile robot to approach the beacon along a guide region formed by the beacon, determining whether the mobile robot has approached an approach region of the beacon, at the beacon, transmitting the response signal to the mobile robot when the mobile robot has approached the approach region of the beacon, and at the mobile robot, performing wall-following navigation along the approach region of the beacon so as to cross the confinement border, if the mobile robot receives the response signal of the beacon.

The beacon may receive the signal indicating that the cleaning of the traveling region has been completed and sense whether the mobile robot has approached a guide region so as to cross the confinement border to move to another region.

According to the embodiment of the present invention, instead of transmission of a signal with high power consumption, a remote controller reception module with low power consumption is used. Only when the remote controller reception module of a beacon senses a signal transmitted from a mobile robot, the sensed result is reported to the mobile robot in the form of a response signal. Accordingly, energy consumption of a beacon battery may be minimized while restricting the traveling region of the mobile robot, and energy efficiency of the beacon battery can be improved. In addition, the Field-of-View (FOV) of the remote control reception module is restricted by a directivity receiver. Only when the signal transmitted from the mobile robot is sensed within the restricted FOV, the sensed result is reported to the mobile robot. Therefore, the movement restriction region of the mobile robot is minimized such that a region to be cleaned by the mobile robot is not restricted. A lighthouse function to guide movement of the mobile robot to another room when the mobile robot completes cleaning of one room is added, such that various user requirements may be satisfied even when several rooms are cleaned.

BRIEF DESCRIPTION OF THE DRAWINGS

These and/or other aspects will become apparent and more readily appreciated from the following description of the embodiments, taken in conjunction with the accompanying drawings of which:

FIG. 9 is a flowchart illustrating a method of guiding a mobile robot to move to another region in a mobile robot system according to an embodiment; and FIG. 10 is a table showing signal transmission of a mobile robot according to a beacon setting state in a mobile robot system according to an embodiment.

DETAILED DESCRIPTION

Figure 1:
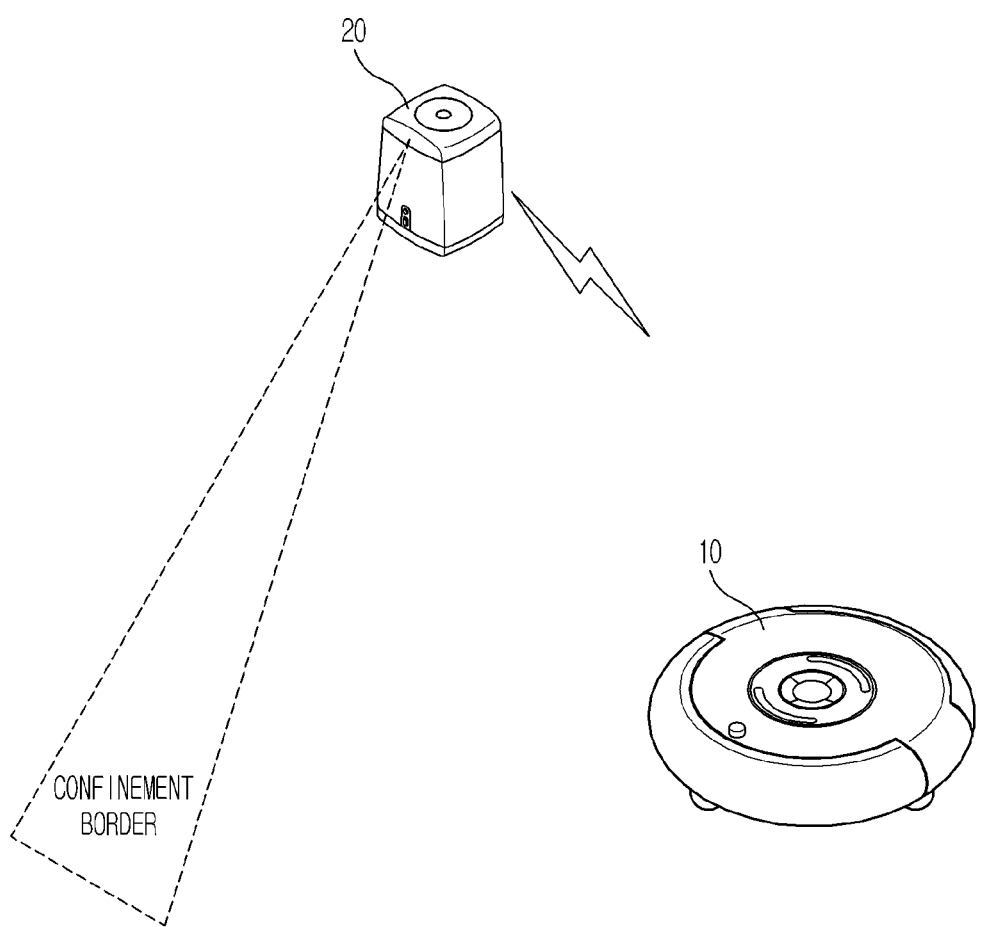
FIG. 1 is a view showing the overall configuration of a mobile robot system according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a view showing the overall configuration of a mobile robot system according to an embodiment. The mobile robot system includes a mobile robot 10 to perform a cleaning operation while autonomously traveling in a predetermined region and to transmit an infrared ray (IR) signal in packet units, and a beacon 20 separated from the mobile robot 10 to receive the signal transmitted from the mobile robot 10.

The beacon 20 is movably mounted at a border (for example, a corner between a living room and a kitchen, a door between rooms, or the like) of a traveling region in order to restrict a traveling region of the mobile robot 10. The beacon 20 detects a signal transmitted from the mobile robot 10 and omnidirectionally transmits a response signal according to the detected result to the mobile robot 10 so as to control avoidance navigation such that the mobile robot 10 is prevented from crossing the border (confinement border) of the traveling region and the mobile robot 10 is prevented from colliding with the beacon 20.

In addition, the beacon 20 has a lighthouse function to lead the mobile robot 10 to another room such that the mobile robot performs a cleaning operation of another room after finishing a cleaning operation of one room.

Figure 2:
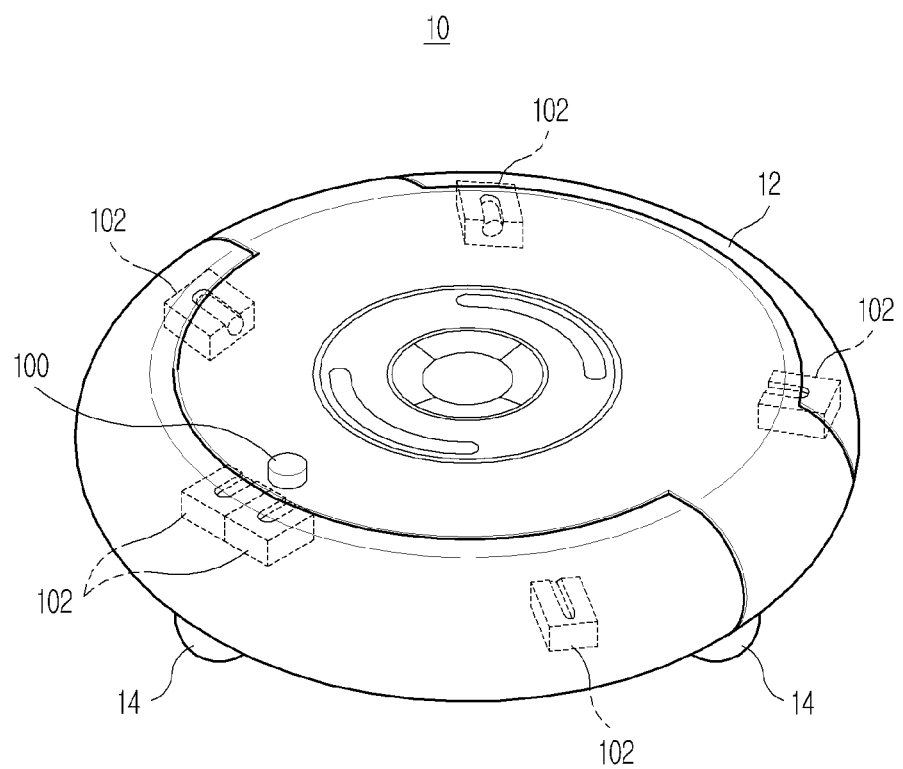
FIG. 2 is a perspective view showing the appearance of a mobile robot according to an embodiment.

FIG. 2 is a perspective view showing the appearance of a mobile robot according to an embodiment.

In FIG. 2, the mobile robot 10 includes a main body 12 forming the appearance thereof and a pair of wheels 14 mounted under the main body 12 at a predetermined interval to drive the mobile robot 10. The pair of driving wheels 14 is selectively driven by a driving unit (motor) rotating the wheels such that the mobile robot 10 travels in a desired direction. A plurality of auxiliary wheels to support the main body 12 and to smoothly travel the mobile robot 10 may be mounted on the front and rear sides of the driving wheels 14.

In addition, the mobile robot 10 includes one transmitter 100 to transmit an IR signal in packet units in order to report that the mobile robot travels, and a plurality (e.g., five) of receivers 102 to receive the response signal of the beacon 20. The transmitter 100 is mounted on the upper side of the front surface of the main body 12 and uses a 360-degree spread lens to transmit the IR signal omnidirectionally (over 360 degrees). The plurality of receivers 102 is mounted on the front surface and the side surface of the main body 12 at a predetermined interval and uses a 180-degree spread lens to receive the IR signal omnidirectionally.

Figure 3:
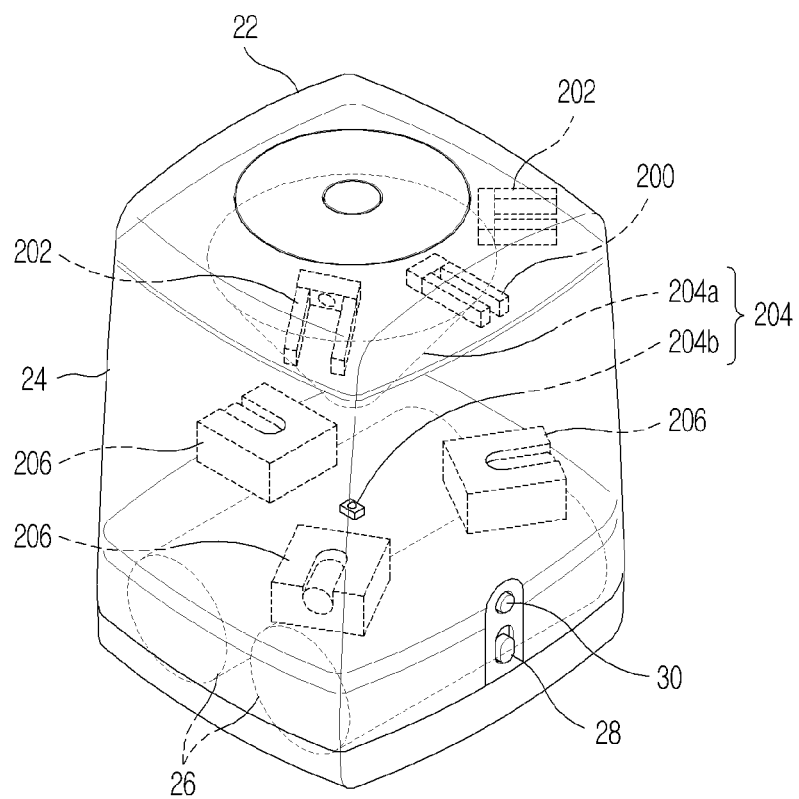
FIG. 3 is a perspective view showing the appearance of a beacon according to an embodiment.

FIG. 3 is a perspective view showing the appearance of a beacon according to an embodiment.

In FIG. 3, the beacon 20 includes a main body 22 forming the appearance thereof, and a sensor window 24 mounted on the circumference of the main body 22 to transmit or receive a signal. The outer wall of the sensor window 24 has a circular shape such that the beam of the transmitted or received signal is not bent.

In addition, the beacon 20 includes a first directivity receiver 200 to receive a signal (high/medium/low/approach signal) transmitted while the mobile robot 10 travels in order to perform cleaning of one room within a restricted Field-Of-View (FOV) and to sense whether the mobile robot 10 has entered a border (confinement border) of a traveling region, second directivity receivers 202 to receive a signal indicating that the cleaning of one room has been completed within the restricted FOV and to sense whether the mobile robot 10 has approached a guide region to guide the mobile robot 10 from one room to another room, an omnidirectional receiver 204 to receive an "approach" signal transmitted from the mobile robot 10 and to sense whether the mobile robot 10 has approached the vicinity of the beacon 20, and a plurality (e.g., three) of transmitters 206 to omnidirectionally transmit a response signal (an IR signal which is transmitted in order to prevent the mobile robot from crossing the confinement border or guide the mobile robot to another region) according to the detected result to the mobile robot 10.

The first directivity receiver 200 is a directivity reception slit for a confinement border recognition mode, which is mounted on the upper side of the front surface of the beacon 20 so as to restrict a region to receive the signal (high/medium/low/approach) signal transmitted while the mobile robot 10 performs cleaning of one room. The directivity reception slit for the confinement border recognition mode has directivity by restricting a signal reception region using a gap (width), a length and a height thereof.

Each of the second directivity receivers 202 is a directivity reception slit for a movement mode, which is mounted on the left or right side of the first directivity receiver 200 so as to restrict a region to receive a signal indicating that the cleaning of one room has been completed from the mobile robot 10. The directivity reception slit for the movement mode has directivity by restricting a signal reception region using a gap (width), a length and a height thereof, similar to the directivity reception slit for the confinement border recognition mode corresponding to the first directivity receiver 200. The width of the directivity reception slit for the movement mode corresponding to the second directivity receiver 202 is greater than that of the directivity reception slit for the confinement border recognition mode in order to lead the mobile robot 10 from one room to another room.

The plurality (e.g., two) of second directivity receivers 202 is mounted on the left and right sides of the first directivity receiver 200 so as to guide the mobile robot 10 from a right reception region to a left reception region or from a left reception region to a right reception region when the mobile robot 10 moves from one room to another room.

The omnidirectional receiver 204 is an omnidirectional receiver provided on the central portion of the lower side of the beacon 20 so as to receive an "approach" signal transmitted from the mobile robot 10 over 360 degrees. The omnidirectional receiver 204 receives the IR signal from any given direction using the refractive and reflective properties of a lens 204a through a reception module 204b and generates a spread light region.

The first and second directivity receivers 200 and 202 and the omnidirectional receiver 204 use a remote controller reception module with very low current consumption of a maximum of about 0.4 to 2.0 mA.

The plurality of transmitters 206 transmits a response signal to report a reception direction and a reception signal to the mobile robot 10 when the first and second directivity receivers 200 and 202 and the omnidirectional receiver 204 receive the signal transmitted from the mobile robot 100, and uses the 180-degree spread lens.

The beacon 20 further includes a battery 26 to supply driving power of the beacon 20, a signal setting switch 28 to set a signal arrival distance of the beacon 20 to "high", "medium" or "low", and a mode setting switch 30 to set an operation mode of the beacon 20 to the "confinement border recognition mode" or the "movement mode".

If the signal setting switch 28 is set to "high", the signal arrival distance of the beacon 20 is about 4 m, which corresponds to ½ of that of a living room of a general home.

If the signal setting switch 28 is set to "medium", the signal arrival distance of the beacon 20 is about 2 m, which corresponds to that of a hallway of a kitchen in a general home.

If the signal setting switch 28 is set to "low", the signal arrival distance of the beacon 20 is about 1 m, which corresponds to the width of a door in a general home.

Figure 4:
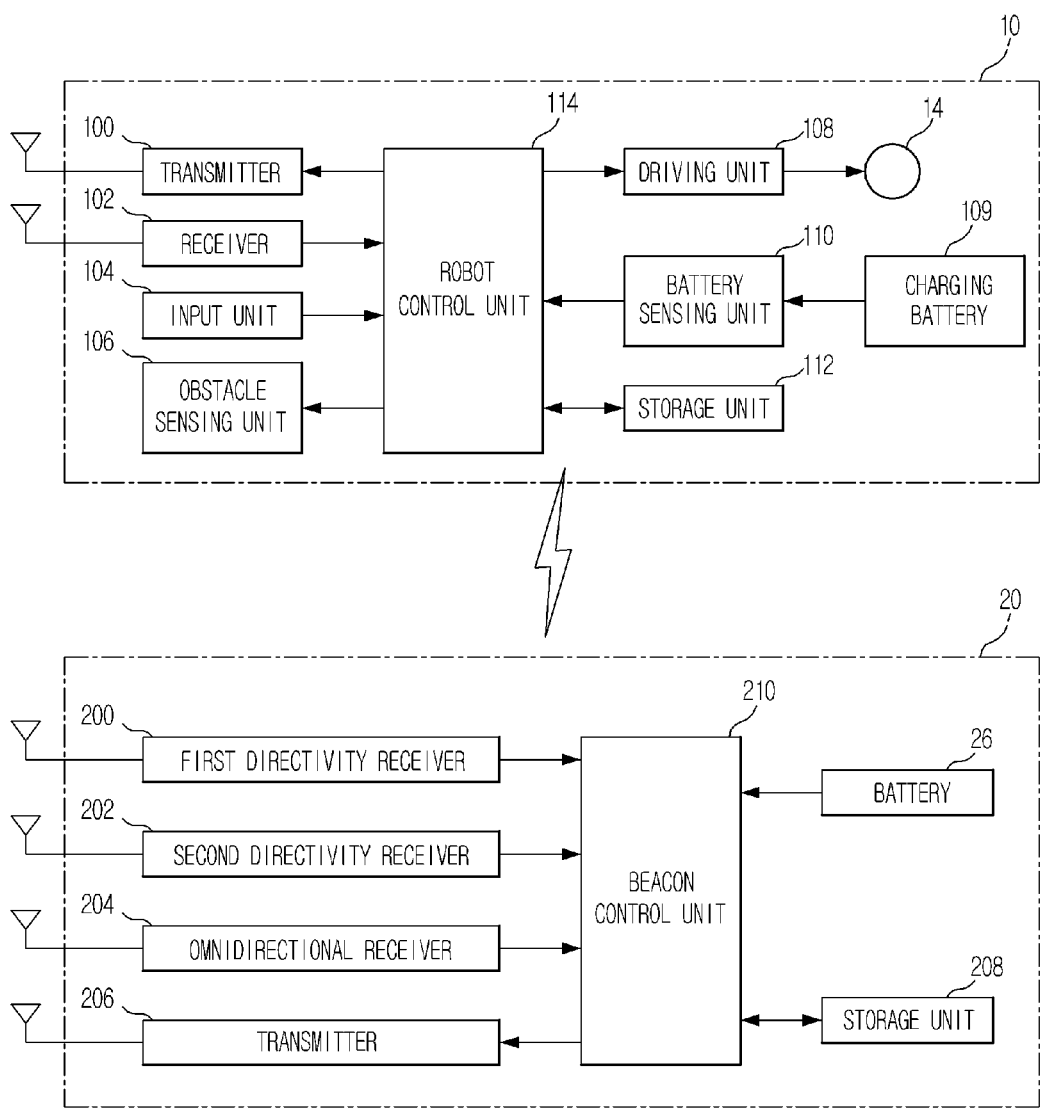
FIG. 4 is a control block diagram of a mobile robot system according to an embodiment.

FIG. 4 is a control block diagram of a mobile robot system according to an embodiment.

In FIG. 4, the mobile robot 10 further includes an input unit 104, an obstacle sensing unit 106, a driving unit 108, a battery sensing unit 110, a storage unit 112, and a robot control unit 114, in addition to the basic configuration of FIG. 2.

The input unit 104 includes a plurality of buttons provided on the upper side of the main body 12 of the mobile robot or a remote controller (not shown) so as to enable a user to input a command to perform the operation of the mobile robot 10.

The obstacle sensing unit 106 senses obstacles such as furniture, office equipment or walls in a region in which the mobile robot 10 travels. The obstacle sensing unit 106 emits an ultrasonic signal to a path along which the mobile robot 10 travels, receives the ultrasonic signal reflected from the obstacle, and senses presence/absence of the obstacle and a distance to the obstacle. At this time, the obstacle sensing unit 106 may be an IR sensor which includes a plurality of IR emitting elements and light receiving elements so as to emit IR and receive the reflected light.

The driving unit 108 drives both driving wheels 14 provided under the main body 12 of the mobile robot such that the mobile robot 10 autonomously travels in the traveling region while changing the direction thereof, based on obstacle information sensed by the obstacle sensing unit 106, without collision with the wall or the obstacle.

The battery sensing unit 110 senses a charging residual amount of a charging battery 109 to supply the driving power (e.g., energy necessary to transmit the signals by the plurality of transmitters) of the mobile robot 10, and sends information about the charging residual amount to the robot control unit 114.

The storage unit 112 is a memory to store an operating program to drive the mobile robot 10, a traveling pattern, and location information of the mobile robot 10 and obstacle information acquired in the traveling process.

The robot control unit 114 is a microprocessor to control the overall operation of the mobile robot 10. The robot control unit 114 controls the transmitter 100 to transmit the IR signal to report that the mobile robot 10 travels in the packet units, and controls avoidance navigation of the mobile robot 10 until the response signal is not received from the beacon 20, if the plurality of receivers 102 receives the response signal from the beacon 20.

In FIG. 4, the beacon 20 further includes a storage unit 208 to store header information or the like of the mobile robot 10 and a beacon control unit 210 to control the overall operation of the beacon 20, that is, to control the plurality of transmitters 206 to report that the first and second directivity receivers 200 and 202 or the omnidirectional receiver 204 have received the signal transmitted from the mobile robot 10 using the IR signal, in addition to the basic configuration shown in FIG. 3.

Hereinafter, the operation and effects of the mobile robot system having the above-described configuration and the method of controlling the same will be described.

Figure 5:
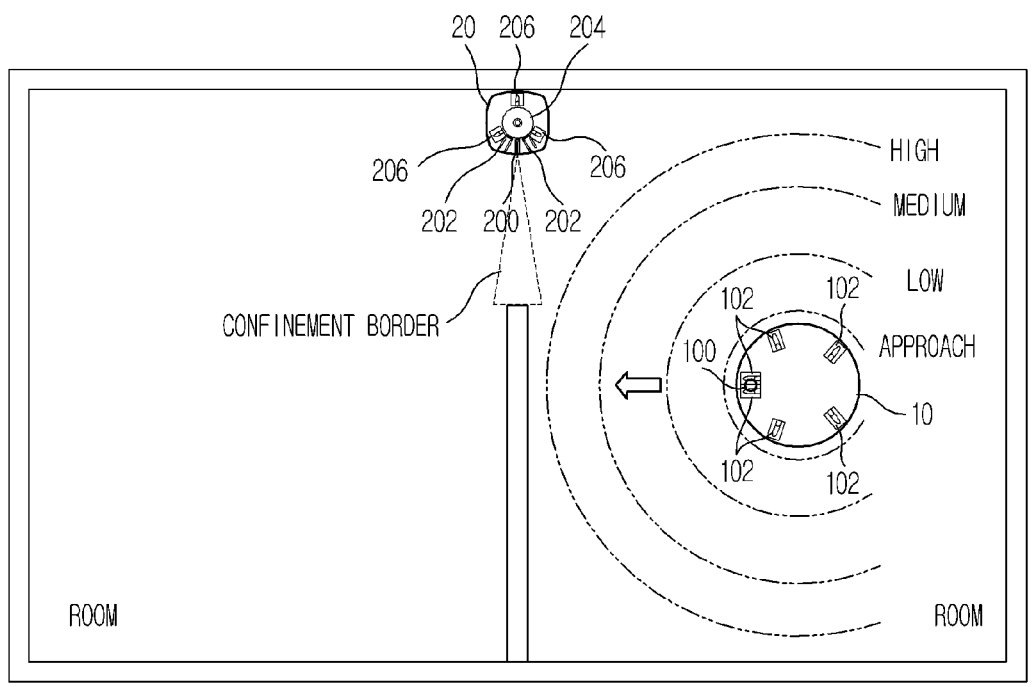
FIG. 5 is a conceptual diagram explaining the principle of the operation of a mobile robot system according to an embodiment.

FIG. 5 is a conceptual diagram explaining the principle of the operation of a mobile robot system according to an embodiment, for example, when the operation mode of the beacon 20 is set to a confinement border recognition mode.

In FIG. 5, the mobile robot 10 autonomously travels in a traveling region (e.g., in a direction denoted by a thick arrow), and the beacon 20 is provided at the border (e.g., a corner between a living room and a kitchen, a door between rooms, or the like) of the traveling region of the mobile robot 10.

As shown in FIG. 5, the mobile robot 10 transmits the IR signal to report that the mobile robot travels through one transmitter 100 provided on the upper side of the front surface of the main body 12 of the robot in packet units while autonomously traveling in the traveling region. At this time, the packet signal transmitted from the mobile robot 10 includes the header information of the mobile robot 10 and signal data having an intensity of "high", "medium", "low", or "approach" to report that the mobile robot 10 approaches. A packet signal transmission time is about 180 to 200 msec per cycle.

In the embodiment, if the mobile robot 10 is located far from the beacon 20, the beacon 20 does not transmit the signal and thus the energy of the beacon battery 26 is not unnecessarily wasted. At this time, the beacon 20 is in a standby state in order to enable the first directivity receiver 200 and the omnidirectional receiver 204 to receive the signal transmitted from the mobile robot 10 using standby power of the remote controller reception module with very low power consumption.

The first directivity receiver 200 of the beacon 20 restricts a confinement border in a slit shape such that the remote controller reception module has directivity, and senses that the mobile robot 10 has approached the confinement border when the signal transmitted from the mobile robot 10 enters the restricted confinement border.

The omnidirectional receiver 204 of the beacon 20 receives the signal transmitted from the mobile robot 10 over 360 degrees and senses that the mobile robot 10 has approached the vicinity of the beacon 20 when the "approach" signal (the arrival distance of the "approach" signal indicates a distance by which the mobile robot is moved to the vicinity of the beacon enough to collide with the beacon) of the signals transmitted from the mobile robot 10 is received.

If the first directivity receiver 200 or the omindirectional receiver 204 of the beacon 20 receives the signal transmitted from the mobile robot 10, the beacon 20 omnidirectionally transmits the response signal to the mobile robot 10 to report that the signal of the mobile robot 10 has been received through the plurality of transmitters 206 such that the mobile robot 10 is prevented from entering the border of the traveling region or the mobile robot 10 is prevented from colliding with the beacon 20.

Accordingly, the mobile robot 10 receives the response signal of the beacon 20 through the plurality of receivers 102 to stop traveling thereof and performs avoidance navigation such that the mobile robot 10 is prevented from crossing the border of the traveling region or the mobile robot is prevented from colliding with the beacon 20.

Figure 6:
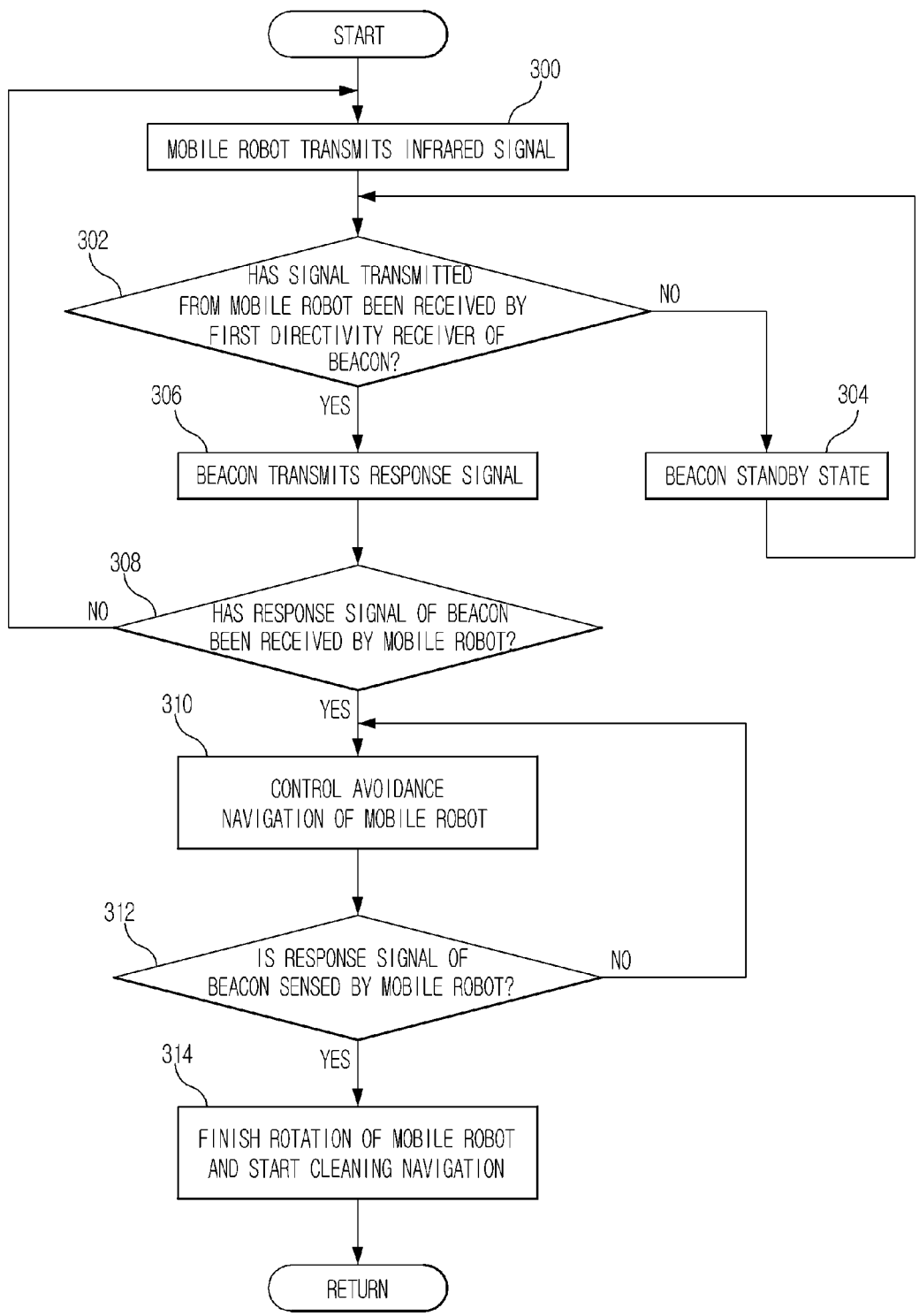
FIG. 6 is a flowchart illustrating a method of restricting a traveling region of a mobile robot in a mobile robot system according to an embodiment.

FIG. 6 is a flowchart illustrating a method of restricting a traveling region of a mobile robot in a mobile robot system according to the embodiment.

In order to describe the operation, it is assumed that the mode setting switch 30 of the beacon 20 is set to the confinement border recognition mode.

In FIG. 6, the mobile robot 10 transmits the IR signal to report that the mobile robot travels through the transmitter 100 in packet units while traveling in the traveling region (300).

At this time, the beacon 20 is in the standby state using standby power of the remote controller reception module with very low power consumption, and receives the signal transmitted from the mobile robot 10 through the first directivity receiver 200 and transmits the received signal to the beacon control unit 210, when the signal transmitted from the mobile robot 10 enters the restricted FOV.

The beacon control unit 210 determines whether the first directivity receiver 200 has received the signal transmitted from the mobile robot 10 (302). If the first directivity receiver 200 of the beacon 20 has not received the signal transmitted from the mobile robot 10, the beacon 20 maintains the standby state (304).

If it is determined that the first directivity receiver 200 of the beacon 20 has received the signal transmitted from the mobile robot 10 in Operation 302, the beacon control unit 210 senses that the mobile robot 10 has entered the confinement border and omnidirectionally transmits the response signal (IR signal) through the plurality of transmitters 206 in order to report a "forbidden region" to the mobile robot 10 (306).

The mobile robot 10 receives the response signal of the beacon 20 through the plurality of receivers 102 and sends the response signal to the robot control unit 114.

The robot control unit 114 determines whether the plurality of receivers 102 has received the response signal of the beacon 20 (308). If the mobile robot 10 has not received the response signal of the beacon 20, the method progresses to Operation 300 and the subsequent operations thereof are repeated.

If it is determined that the mobile robot 10 has received the response signal of the beacon 20 in Operation 308, the robot control unit 114 stops the cleaning navigation of the mobile robot 10 and controls avoidance navigation such that the mobile robot 10 rotates so as not to cross the confinement border (310).

Thereafter, the robot control unit 114 determines whether the response signal of the beacon 20 is not sensed by the rotation avoidance navigation of the mobile robot 10 (312), and continues to perform rotation avoidance navigation of the mobile robot 10 until the response signal of the beacon 20 is not sensed, if the response signal of the beacon 20 is sensed.

If it is determined that the response signal of the beacon 20 is not sensed in Operation 312, the rotation avoidance navigation of the mobile robot 10 is finished and cleaning navigation of the mobile robot is started in a direction in which the rotation is finished (314).

Figure 7:
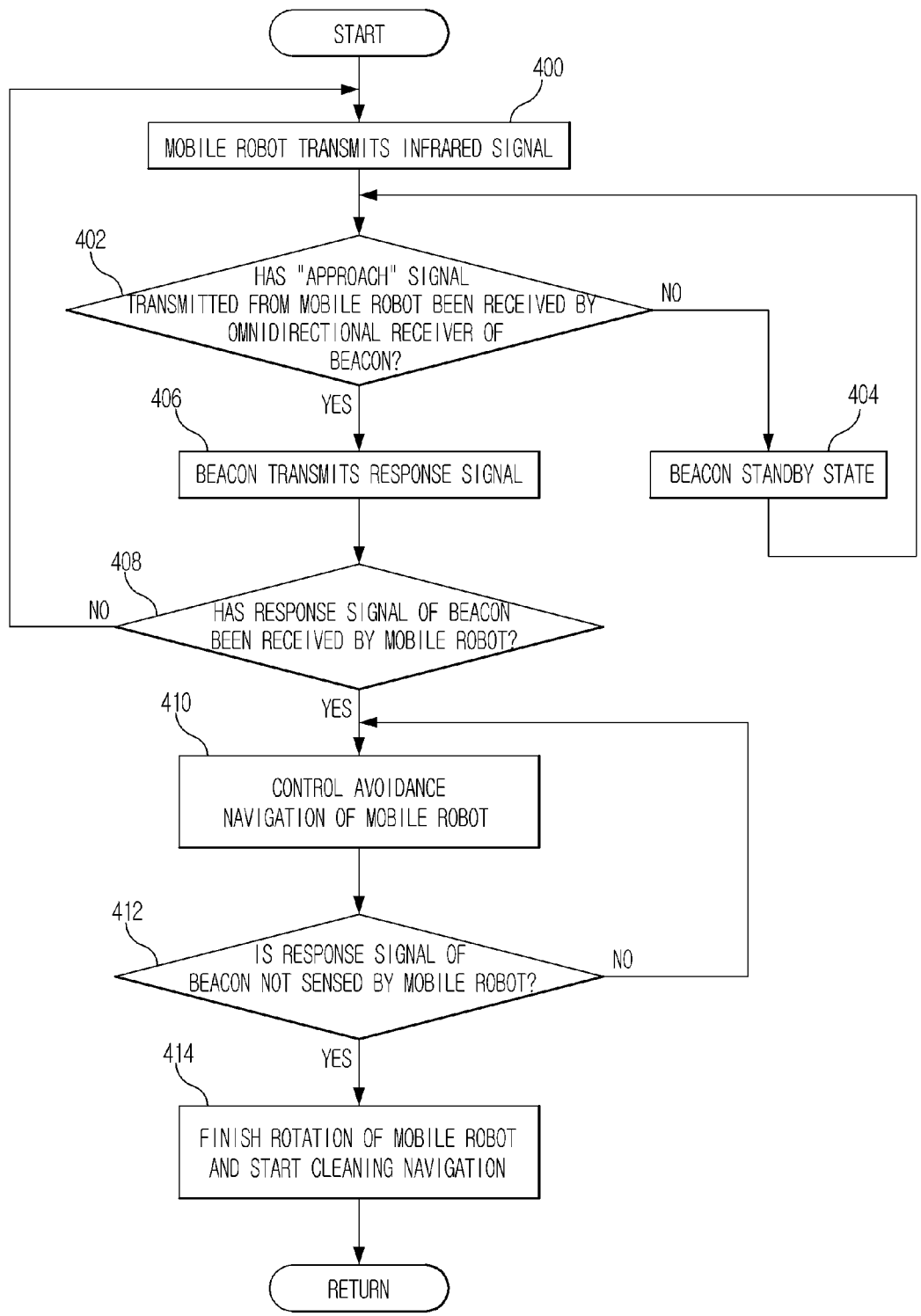
FIG. 7 is a flowchart illustrating a method of preventing collision of a mobile robot in a mobile robot system according to an embodiment.

FIG. 7 is a flowchart illustrating a method of preventing collision of a mobile robot in a mobile robot system according to an embodiment.

In order to describe the operation, it is assumed that the mode setting switch 30 of the beacon 20 is set to the confinement border recognition mode.

In FIG. 7, the mobile robot 10 transmits the IR signal to report that the mobile robot travels through the transmitter 100 in packet units while traveling in the traveling region (400).

At this time, the beacon 20 is in the standby state using standby power of the remote controller reception module with very low power consumption, and receives the "approach" signal transmitted from the mobile robot 10 through the omnidirectional receiver 204 and transmits the received signal to the beacon control unit 210.

The beacon control unit 210 determines whether the omnidirectional receiver 204 has received the signal transmitted from the mobile robot 10 (402). If the omnidirectional receiver 204 of the beacon 20 has not received the "approach" signal transmitted from the mobile robot 10, the beacon 20 maintains the standby state (404).

If it is determined that the directivity receiver 200 of the beacon 20 has received the "approach" signal transmitted from the mobile robot 10 in Operation 402, the beacon control unit 210 senses that the mobile robot 10 has approached the vicinity of the beacon 20 and omnidirectionally transmits the response signal (IR signal) through the plurality of transmitters 206 in order to report a "forbidden region" to the mobile robot 10 (406).

The mobile robot 10 receives the response signal of the beacon 20 through the plurality of receivers 102 and sends the response signal to the robot control unit 114.

The robot control unit 114 determines whether the plurality of receivers 102 has received the response signal of the beacon 20 (408). If the mobile robot 10 has not received the response signal of the beacon 20, the method progresses to Operation 400 and the subsequent operations thereof are repeated.

If it is determined that the mobile robot 10 has received the response signal of the beacon 20 in Operation 408, the robot control unit 114 stops cleaning navigation of the mobile robot 10 and controls avoidance navigation such that the mobile robot 10 rotates so as not to collide with the beacon 20 (410).

Thereafter, the robot control unit 114 determines whether the response signal of the beacon 20 is not sensed by the rotation avoidance navigation of the mobile robot 10 (412), and continues to perform rotation avoidance navigation of the mobile robot 10 in an opposite direction of the traveling direction until the response signal of the beacon 20 is not sensed, if the response signal of the beacon 20 is sensed.

If it is determined that the response signal of the beacon 20 is not sensed in Operation 412, the rotation avoidance navigation of the mobile robot 10 in the opposite direction of the traveling direction is finished and cleaning navigation is started in the opposite direction of the traveling direction (414).

Figure 8:
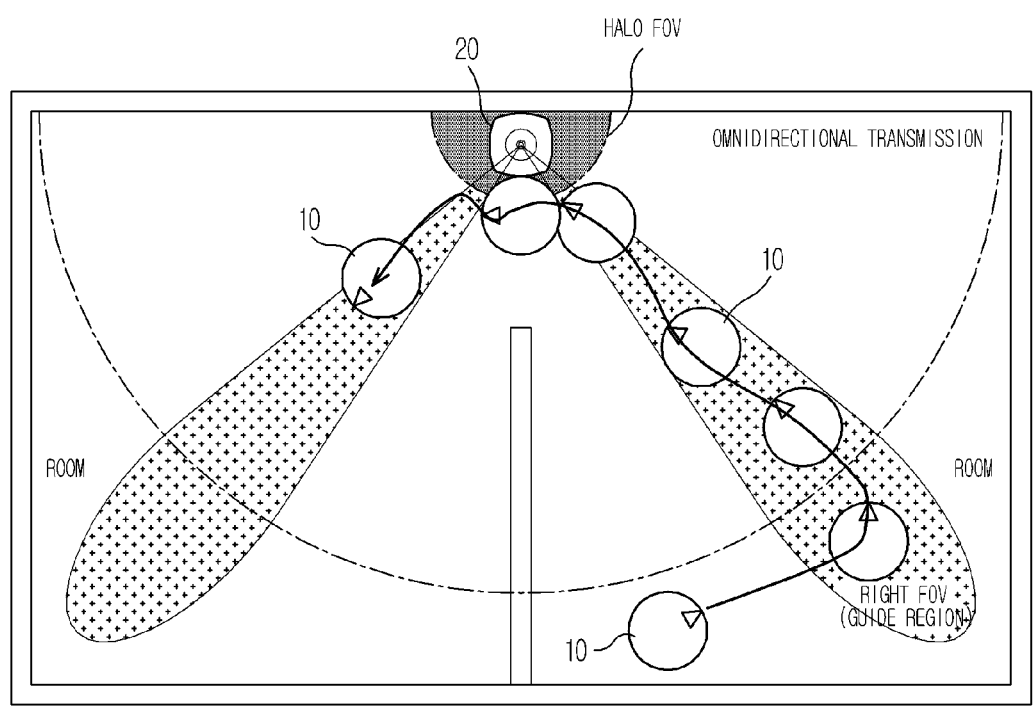
FIG. 8 is a conceptual diagram explaining the principle of operation of a mobile robot system according to an embodiment.

FIG. 8 is a conceptual diagram explaining the principle of the operation of a mobile robot system according to an embodiment, for example, when the operation mode of the beacon 20 is set to a movement mode.

In FIG. 8, the mobile robot 10 travels along a guide region and the beacon 20 is mounted between a border (e.g., a door between rooms) of a traveling region of the mobile robot 10.

As shown in FIG. 8, the mobile robot 10 transmits an IR signal to report that cleaning is completed over 360 degrees through the transmitter 100 provided on the upper side of the front surface of the main body 12 of the robot, if the mobile robot 10 completes cleaning of one room.

The second directivity receiver 202 of the beacon 20 restricts a left or right FOV (guide region) in a slit shape such that the remote controller reception module has directivity and senses that the mobile robot 10 has entered the guide region when the signal transmitted from the mobile robot 10 enters the restricted left or right FOV (guide region).

The omnidirectional receiver 204 of the beacon 20 receives the signal transmitted from the mobile robot 10 over 360 degrees and senses that the mobile robot 10 has approached the vicinity of the beacon 20 when the "approach" signal transmitted from the mobile robot 10 is received.

In the case where the second directivity receiver 202 or the omnidirectional receiver 204 of the beacon 20 senses the signal transmitted from the mobile robot 10, the beacon 20 omnidirectionally transmits a response to report that the signal of the mobile robot 10 has been received through the plurality of transmitters 206 such that the mobile robot 10 approaches the beacon 20 along the guide region formed by the beacon 20 so as to move from one room to another room or the mobile robot 10 performs wall-following navigation along an approach region (halo FOV) when the mobile robot senses the "approach" signal.

Accordingly, the mobile robot 10 receives the response signal of the beacon 20 through the plurality of receivers 102, approaches the beacon 20 along the guide region, and performs wall-following navigation along the approach region (halo FOV) of the beacon 20 when approaching the approach region (halo FOV) of the beacon 20 so as not to cross the confinement border.

Although, in FIG. 8, the case were the mobile robot 10 approaches the beacon 20 along the right guide region, performs wall-following navigation along the approach region of the beacon 20 after approaching the approach region of the beacon 20, and moves from the right room to the left room is described, the embodiments are not limited thereto. The mobile robot 10 may approach the beacon 20 along the left guide region, perform wall-following navigation along the approach region of the beacon 20 after approaching the approach region of the beacon 20, and move from the left room to the right room.

FIG. 9 is a flowchart illustrating a method of guiding a mobile robot to another region in a mobile robot system according to an embodiment.

In order to describe the operation, it is assumed that the mode setting switch 30 of the beacon 20 is set to the movement mode.

In FIG. 9, the mobile robot 10 transmits the IR signal for the movement mode to report that cleaning has been completed over 360 degrees through the transmitter 100, if cleaning of one room is completed (500).

At this time, the beacon 20 is in the standby state using standby power of the remote controller reception module with very low power consumption, and receives the signal transmitted from the mobile robot 10 through the second directivity receiver 202 and transmits the received signal to the beacon control unit 210, when the signal for the movement mode transmitted from the mobile robot 10 enters the restricted left or right FOV.

Accordingly, the beacon control unit 210 determines whether the second directivity receiver 202 has received the signal transmitted from the mobile robot 10 (502). If the second directivity receiver 202 of the beacon 20 has not received the signal transmitted from the mobile robot 10, the beacon 20 maintains the standby state (504).

If it is determined that the second directivity receiver 202 of the beacon 20 has received the signal transmitted from the mobile robot 10 in Operation 502, the beacon control unit 210 senses that the mobile robot 10 has entered the restricted left or right FOV (guide region) and omnidirectionally transmits the response signal (IR signal) through the plurality of transmitters 206 in order to report the "guide region" to the mobile robot 10 (506).

The mobile robot 10 receives the response signal of the beacon 20 through the plurality of receivers 102 and sends the response signal to the robot control unit 114.

The robot control unit 114 determines whether the plurality of receivers 102 has received the response signal of the beacon 20 (508). If the mobile robot 10 has not received the response signal of the beacon 20, the method progresses to Operation 500 and the subsequent operations thereof are repeated.

If it is determined that the mobile robot 10 has received the response signal of the beacon 20 in Operation 508, the robot control unit 114 controls guide navigation such that the mobile robot 10 approaches the beacon 20 along the guide region formed by the beacon 20 so as to move from one room of which cleaning has completed to another room (510).

Thereafter, the beacon control unit 210 determines whether the omnidirectional receiver 204 has received the "approach" signal transmitted from the mobile robot 10, while guide navigation is performed such that the mobile robot 10 approaches the approach region (halo FOV) of the beacon 20 (512).

If it is determined that the omnidirectional receiver 204 of the beacon 20 has not received the "approach" signal transmitted from the mobile robot 10 in Operation 512, the method progresses to Operation 510 and the beacon 20 continues to perform the guide navigation of the mobile robot 10.

If it is determined that the omnidirectional receiver 204 of the beacon 20 has received the "approach" signal transmitted from the mobile robot 10 in Operation 512, the beacon control unit 210 senses that the mobile robot 10 has approached the approach region (halo FOV) of the beacon 20, and the beacon 20 omnidirectionally transmits a response signal to report that the "approach" signal of the mobile robot 10 has been received through the plurality of transmitters 206.

Then, the mobile robot 10 receives the response signal of the beacon 20 through the plurality of receivers 102 and controls wall-following navigation so as to cross the confinement border along the approach region (halo FOV) of the beacon 20 (514).

Thereafter, the robot control unit 114 determines whether the mobile robot 10 has crossed the confinement border along the approach region (halo FOV) (516), and the method progresses to Operation 514 so as to continue to perform wall-following navigation such that the mobile robot crosses the confinement border along the approach region (halo FOV) if the mobile robot 10 has not crossed the confinement border.

If it is determined that the mobile robot 10 has crossed the confinement border in Operation 516, the navigation of the mobile robot 10 is controlled through the other guide region (the left guide region if the mobile robot moves from the right room to the left room along the right guide region) (518).

In the control of the navigation of the mobile robot 10 through the other guide region, the mobile robot 10 continues to perform wall-following along the approach region (halo FOV) until the second directivity receiver 202 (more particularly, the second directivity receiver shown on the left side of FIG. 5) of the beacon 20 receives the signal transmitted from the mobile robot 10 is received after the mobile robot 10 crosses the confinement border and, when the second directivity receiver 202 of the beacon 20 receives the signal transmitted from the mobile robot 10, it is sensed that the mobile robot 10 has entered the left reception region (guide region) and the mobile robot 10 is controlled to start the cleaning navigation of the left room (that is, another room) on the basis of the left guide region (that is, the other guide region).

FIG. 10 is a table showing signal transmission of a mobile robot according to a beacon setting state in a mobile robot system according to an embodiment.

In FIG. 10, the user operates the signal setting switch 28 of the beacon 20 so as to set the arrival distance of the beacon 20 to "high", "medium" or "low". Then, even when the beacon 20 receives the signal transmitted from the mobile robot 10, the beacon 20 does not transmit the response signal according to the set value such that the avoidance navigation of the mobile robot 10 may be differently controlled.

For example, if the user sets the signal setting switch 28 of the beacon 20 to "low", even when the first directivity receiver 200 of the beacon 20 receives the signal transmitted from the mobile robot 10, the beacon 20 does not omnidirectionally transmit the response signal such that the mobile robot 10 ignores avoidance navigation with respect to the signal with the intensity of "high" or "medium" of the signals transmitted from the mobile robot 10, and reports avoidance navigation with respect to only the signal with the intensity of "low" or "approach" of the signals transmitted from the mobile robot 10.

For example, if the user sets the signal setting switch 28 of the beacon 20 to "medium", even when the first directivity receiver 200 of the beacon 20 receives the signal transmitted from the mobile robot 10, the beacon 20 does not omnidirectionally transmit the response signal such that the mobile robot 10 ignores avoidance navigation with respect to the signal with the intensity of "high" of the signals transmitted from the mobile robot 10, and reports avoidance navigation with respect to only the signal with the intensity of "medium", "low" or "approach" of the signals transmitted from the mobile robot 10.

The above-described example indicates the case where the first directivity receiver 200 of the beacon 20 receives the signal transmitted from the mobile robot 10 when the mode setting switch 30 of the beacon 20 is set to the "confinement border recognition mode". If the user sets the mode setting switch 30 of the beacon 20 to the "movement mode", the second directivity receiver 202 of the beacon 20 receives the signal for the movement mode transmitted from the mobile robot 10 to lead the mobile robot 10 to another room through the left and right guide regions.

Although the signal transmitted from the mobile robot 10 is the IR signal in the embodiments, the embodiments are not limited thereto. Even when a visible ray, an ultrasonic wave, or a laser signal is used, the same effects can be realized.

Although the signal transmitted from the beacon 20 is the IR signal in the embodiments, the embodiments are not limited thereto. Even when a visible ray, an ultrasonic wave, a Radio Frequency (RF) signal or a laser signal is used, the same effects can be realized.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A method of controlling a mobile robot system, the method comprising:
    at a mobile robot, transmitting a signal while traveling in a traveling region;
    monitoring the signal transmitted from the mobile robot and determining a distance between the beacon and the mobile robot by the beacon;
    at the beacon, transmitting a guide signal to the mobile robot if the mobile robot has approached the beacon within a predetermined distance; and
    at the mobile robot, performing navigation changed on a basis of the guide signal, wherein the performing navigation changed on the basis of the guide signal includes guiding the mobile robot to cross a confinement border of the traveling region and to move to another region.

2. The method according to claim 1, wherein the signal transmitted from the mobile robot includes an infrared ray, a visible ray, an ultrasonic wave or a laser beam.

3. The method according to claim 1, wherein the guide signal transmitted from the beacon includes an infrared ray, a visible ray, an ultrasonic wave, a Radio Frequency (RF) signal or a laser beam.

4. The method according to claim 1, wherein the determining of the distance between the beacon and the mobile robot includes determining that the mobile robot has approached the beacon within the predetermined distance if the beacon senses an approach signal transmitted from the mobile robot.

5. A method of controlling a mobile robot system, the method comprising:
    at a mobile robot, transmitting a signal when cleaning of a traveling region is completed;
    determining whether the signal transmitted from the mobile robot is sensed within a restricted Field-of-View (FOV) of a beacon or as an approach signal;
    at the beacon, transmitting a guide signal to the mobile robot if the signal transmitted from the mobile robot is sensed within the restricted FOV; and
    performing movement navigation on a basis of the guide signal, wherein the performing of movement navigation on the basis of the guide signal includes guiding the mobile robot to cross a confinement border of the traveling region and to move to another region.

6. The method according claim 5, wherein the guiding of the mobile robot includes:
    enabling the mobile robot to approach the beacon along a guide region formed by the beacon,
    determining whether the mobile robot has approached an approach region of the beacon,
    at the beacon, transmitting the response signal to the mobile robot when the mobile robot has approached the approach region of the beacon, and
    at the mobile robot, performing wall-following navigation along the approach region of the beacon so as to cross the confinement border, if the mobile robot receives the response signal of the beacon.

7. The method according claim 5, wherein the beacon receives the signal indicating that the cleaning of the traveling region has been completed and senses whether the mobile robot has approached a guide region to cross the confinement border to move to another region.

8. The method according to claim 1, wherein the performing of navigation changed on the basis of the guide signal includes performing avoidance navigation the mobile robot to prevent collision with the beacon.

* * * * *